(12) United States Patent
O'Regan et al.

(10) Patent No.: US 6,518,873 B1
(45) Date of Patent: Feb. 11, 2003

(54) VARIABLE RESISTIVE ELEMENT

(75) Inventors: Eoin O'Regan, Cork (IE); Katherine Murphy, Kerry (IE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 09/951,702

(22) Filed: Sep. 13, 2001

(51) Int. Cl.[7] .............................................. H01C 10/48
(52) U.S. Cl. ...................... 338/190; 338/162; 338/185
(58) Field of Search ................................. 338/307, 309, 338/162, 185, 190, 194

(56) References Cited

U.S. PATENT DOCUMENTS

| | | | | |
|---|---|---|---|---|
| 3,629,776 A | * | 12/1971 | Watano | 338/140 |
| 4,495,524 A | * | 1/1985 | Kakuhashi et al. | 338/314 |
| 4,908,598 A | * | 3/1990 | Burger et al. | 338/174 |
| 4,914,417 A | * | 4/1990 | Matsui et al. | 338/174 |
| 5,086,785 A | * | 2/1992 | Gentile et al. | 128/782 |
| 5,275,044 A | * | 1/1994 | Riley | 73/313 |
| 5,357,815 A | * | 10/1994 | Williamson | 73/866.3 |
| 5,379,016 A | * | 1/1995 | Smith et al. | 338/309 |
| 5,475,359 A | * | 12/1995 | Hatayama et al. | 338/160 |
| 5,570,076 A | * | 10/1996 | Erickson et al. | 338/163 |
| 5,746,088 A | | 5/1998 | Sawert et al. | |
| 5,982,272 A | * | 11/1999 | Masuda | 338/162 |
| 6,021,668 A | | 2/2000 | Sawert et al. | |
| 6,032,521 A | * | 3/2000 | Miwa et al. | 73/118.1 |
| 6,097,276 A | * | 8/2000 | Van Den Broek et al. | 338/9 |
| 6,212,950 B1 | | 4/2001 | Cooper et al. | |

FOREIGN PATENT DOCUMENTS

| | | |
|---|---|---|
| FR | 2455346 | 4/1980 |
| GB | 2048495 | 12/1980 |
| WO | WO0154144 | 7/2001 |

* cited by examiner

*Primary Examiner*—Karl D. Easthom
(74) *Attorney, Agent, or Firm*—Klein, O'Neill & Singh, LLP

(57) ABSTRACT

A variable resistive element for use in a sensing unit for measuring liquid level in a container, through interaction with a sliding electrical contact operating in conjunction with a float, includes a conductor pattern deposited on a substrate. A region of resistive material is also deposited on the substrate and makes electrical contact with the conductive pattern. A region of the conductor pattern functions as a contact area for the sliding electrical contact. This region is coated with a plating material, for example nickel or a nickel alloy. The use of the plating reduces the requirements for expensive metals in the conductor pattern. The variable resistive element is particularly suited for use in a fuel level sensor.

11 Claims, 8 Drawing Sheets

VARIABLE RESISTIVE ELEMENT

CROSS-REFERENCE TO RELATED APPLICATION

Not Applicable

FEDERALLY-SPONSORED RESEARCH OR DEVELOPMENT

Not Applicable

BACKGROUND OF THE INVENTION

This invention relates generally to resistive elements for use in systems for measuring the level of liquid in a vessel and in particular for the measurement of fuel quantity, and is more particularly directed toward a resistive element that may be used in the construction of a submersible sensor designed for installation in a fuel tank.

It is well known that the fuel tank of an automobile is a hostile environment for a sensor system. When electrical fuel level sensing systems were first developed, the transmitter units, which were intended to operate at least partially submerged in the fuel, were designed as potentiometric sensors of a wire-wound or metal foil type. A float arrangement was used to detect the liquid level, and by coupling the float to a sliding contact on the potentiometric sensor, a measurement system in the vehicle could track changes in resistance that occurred with variations in liquid level.

Unfortunately, the early potentiometric transmitter units were not durable enough to withstand the hostile environment. Breakage of wire in the wire-wound resistive sensor types, and peeling of foil in the metal-foil variety of sensor, often led to early failure of the sensing system. Of course, the deleterious effect of automotive fuel on the wire or metal foil tended to accelerate system wear.

Transmitter units manufactured using wire-wound or metal foil techniques were eventually replaced by resistive film screen-printed on a durable substrate, such as a substrate of ceramic material. In earlier versions of these screen printed sensors, a single or dual wiper moved along a printed resistive track in response to fuel level changes conveyed to the wiper by an associated float. The printed resistive track is typically deposited on a substrate of ceramic material or porcelain coated steel for durability. Of course, the printed resistive region, even though formed from glass frit in combination with precious metals, is still subject to wear due to friction with the wiper arm.

In a variation on the early sensors of the prior art, an example 100 of which is shown in FIG. 1, the wiper contacts are designed to slide across a network of conductors 101 rather than the resistive film 102 itself Designing the system so that the wiper makes contact with high metal content conductive regions provides a lower resistance path in operation.

The conductive regions 101 are also designed for durability and long life in the presence of hostile solvents such as gasoline, but the materials for these conductive areas must generally be selected from among an expensive group of candidate materials. Suitable metals include palladium, platinum, Gold, and silver, which can be combined into alloys that perform adequately in the intended environment.

A laser may be used to adjust, or trim, the thick film resistor to the required resistance value, by making a series of cuts, at appropriate points along the resistor.

The various processing steps, typically used in the manufacture of the prior art resistor element of FIG. 1, are illustrated in FIG. 2. Conventionally, a number of resistor elements are typically fabricated on a single substrate. To facilitate their subsequent separation, the ceramic substrate is initially scribed 201, for example by a laser scribing process. The conductive tracks are deposited 202, using a conventional thick film screen printing process. The tracks are dried in an oven and then fired 203 in a furnace. Resistor material is then deposited, using a conventional thick film printing process 204, over and between the conductive tracks. The resistor material is then dried in an oven and subsequently fired 205 in a furnace. The resistor is then laser trimmed 206 to the required resistance value, by making a series of cuts into the resistor, at appropriate points along the resistor. The location and size of cut is determined by reference to measurements made of the resistor value, facilitated by a series of test pads 108 formed with the conductive tracks.

The previously scribed ceramic is then broken 207 into individual resistor elements by breaking along the previously scribed lines and finally the individual elements are tested, packed and shipped to customers (shown as a single step 208).

The conductive traces are arranged such that the wiper contact will only contact the conductive traces in one or more wiper contact areas (identified in dashed outline in FIG. 1 as reference numerals 104a, 104b) over the working sweep of the wiper. In practice, two concentric wiper contact areas 104a, 104b may be used to reduce contact noise and increase sensor reliability. The wiper cannot directly connect with the thick film resistor 102 as the contact resistance would be excessive and the wiper contact would wear away before achieving the required number of life cycles demanded by system specifications.

The conductive traces 101 generally consist of precious metal alloys such as Palladium-Silver and to a lesser degree Gold-Platinum or Gold Platinum-Palladium. These alloys are resistant to the thick film manufacturing process and to subsequent long-term exposure to various fuels. They are also formulated to be sufficiently hard to withstand the wear associated with hundreds of thousands of cycles of the wiper contact. The alloying elements, which are used to impart the hardness properties to either the gold or silver conductors, are selected from the Platinum Group of Metals (PGM) and in particular, Palladium. The addition of Palladium to Silver also mitigates against the tendency of silver to form ions in the presence of moisture, and physically migrate between conductive tracks, under the influence of an electrical potential. This phenomenon, known as metal migration, is minimized as the proportion of Palladium in the alloy is increased. The Platinum Group Metals are expensive elements and significantly contribute to the overall material cost of the resistor element.

In recent years, increased environmental legislation has resulted in efforts to significantly reduce the sulphur content in automotive fuels. The process of removing the sulphur from fuels is known to leave residual traces of highly reactive sulphur compounds behind. These sulphur compounds have been found to react with the silver in palladium/silver traces on conventional fuel sensor elements forming non-conducting silver sulphide deposits, which can lead to sensor failure.

Consequently, a need arises for a resistor element that is suitably rugged for fuel tank applications, that minimizes the exposure of silver alloy traces, and has a reduced requirement for Platinum Group Metals.

SUMMARY OF THE INVENTION

These needs and others are satisfied by the present invention, in which a variable resistive element is provided for use with at least one associated sliding electrical contact. The variable resistive element comprises a substrate, a first conductor pattern deposited on the substrate, at least one resistive region making electrical contact with the first conductive pattern. The first conductor defines a contact area for the associated sliding electrical contact and in which portion the conductor pattern is plated with a first plating. The first plating may be nickel or a nickel alloy. The substrate is preferably ceramic.

In accordance with one aspect of the invention, the resistive element is incorporated in a sensor element, which further comprises a wiper arm having at least one electrical contact for contacting the resistive element. Preferably, the electrical contact is nickel or palladium nickel. The sensor element is particularly suited for use as a fuel card sensor element in a fuel sensor. The fuel level sensor may further include a wiper arm having at least one sliding electrical contact movable along a contact area of the first conductor pattern of the resistive element, and a float arrangement coupled to the wiper.

In accordance with a further aspect of the invention, the variable resistive element further comprises a protective layer, which substantially covers the resistive element. The protective layer may be a polymeric material or a low temperature glass material. The protective layer may also cover sections of the conductor pattern.

In accordance with yet another aspect of the invention, the portion plated of the resistive element plated with the first plating is further plated with a second plating. The second plating may be gold or a gold alloy.

In accordance with a second embodiment of the invention, a method of manufacture of a resistive element is provided, the method comprising the steps of providing a substrate, the substrate having a pattern of conductive traces fixed thereon and at least one region of resistive material in contact with the pattern of conductive traces, and plating at least one section of the first pattern of conductive traces with a first plating. The first plating may be nickel or a nickel alloy. The plating process may be an electroless plating process.

In accordance with one aspect of this second embodiment, a further step of applying a protective layer to substantially cover the resistive material prior to plating step may be provided.

In accordance with a third embodiment of the invention, a variable resistive element is provided comprising a substrate, a first conductor pattern disposed on a surface of the substrate, at least one resistive region making electrical contact with the first conductive pattern, wherein at least one area of the first conductor pattern comprises a layer of nickel or nickel alloy. The substrate may be ceramic.

In one aspect of the third embodiment, the first conductor pattern of the variable resistive element may include a layer of silver compound material positioned between the layer of nickel or nickel alloy and the substrate. The layer of nickel or nickel alloy may be covered with a further metal layer. The further metal layer may be gold or a gold alloy.

In a further aspect of the invention, a sensor element is provided having the resistive element and including a wiper arm having at least one electrical contact for contacting the resistive element, wherein the contact portion of the electrical contact is nickel or palladium nickel.

In one further aspect of the invention, the variable resistive element further comprises a protective layer substantially covering the resistive element. The protective layer may be a plating resistant polymeric material or a plating resistant glass material. Preferably, the glass may be a low tmperature glass. The protective layer may also cover sections of the conductor pattern.

Further objects, features and advantages of the present invention will become apparent from the following description and drawings.

DETAILED DESCRIPTION OF THE INVENTION

Figure 1:
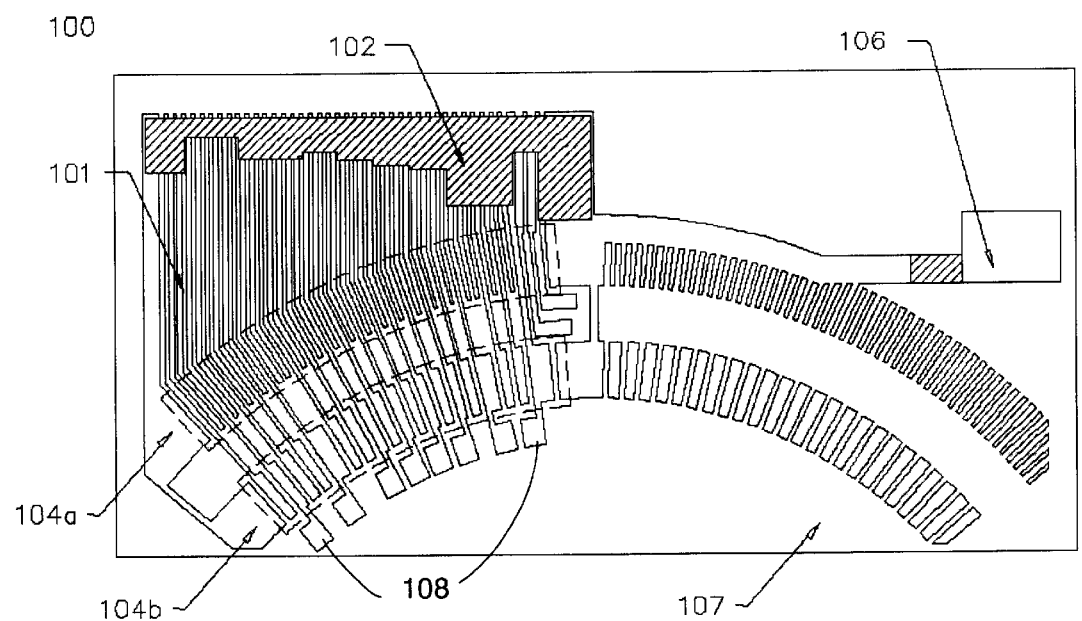
FIG. 1 illustrates a known type of resistive element for use in a fuel level sensor.

There is described herein a fuel level sensing system that offers distinct advantages when compared to the prior art. FIG. 1 depicts a portion of a variable resistor element 100 used in existing liquid fuel sensor systems which in use is coupled to a float that rides along the surface of the fuel in a storage tank. As the fuel level varies, the float position is displaced, moving a wiper in contact areas 104a, 104b of the traces 101 on the variable resistor element 100. Movement of the wiper changes the resistance between the wiper and a reference point 106 on the resistor element 100.

Conventionally, the resistor element 100 comprises a ceramic substrate 107 and a series of thick film conductive traces 101, over which is printed a thick film resistor 102. A laser may be used to adjust or trim the thick film resistor to the required resistor value by making a series of cuts at appropriate points along the resistor 102.

Figure 2:
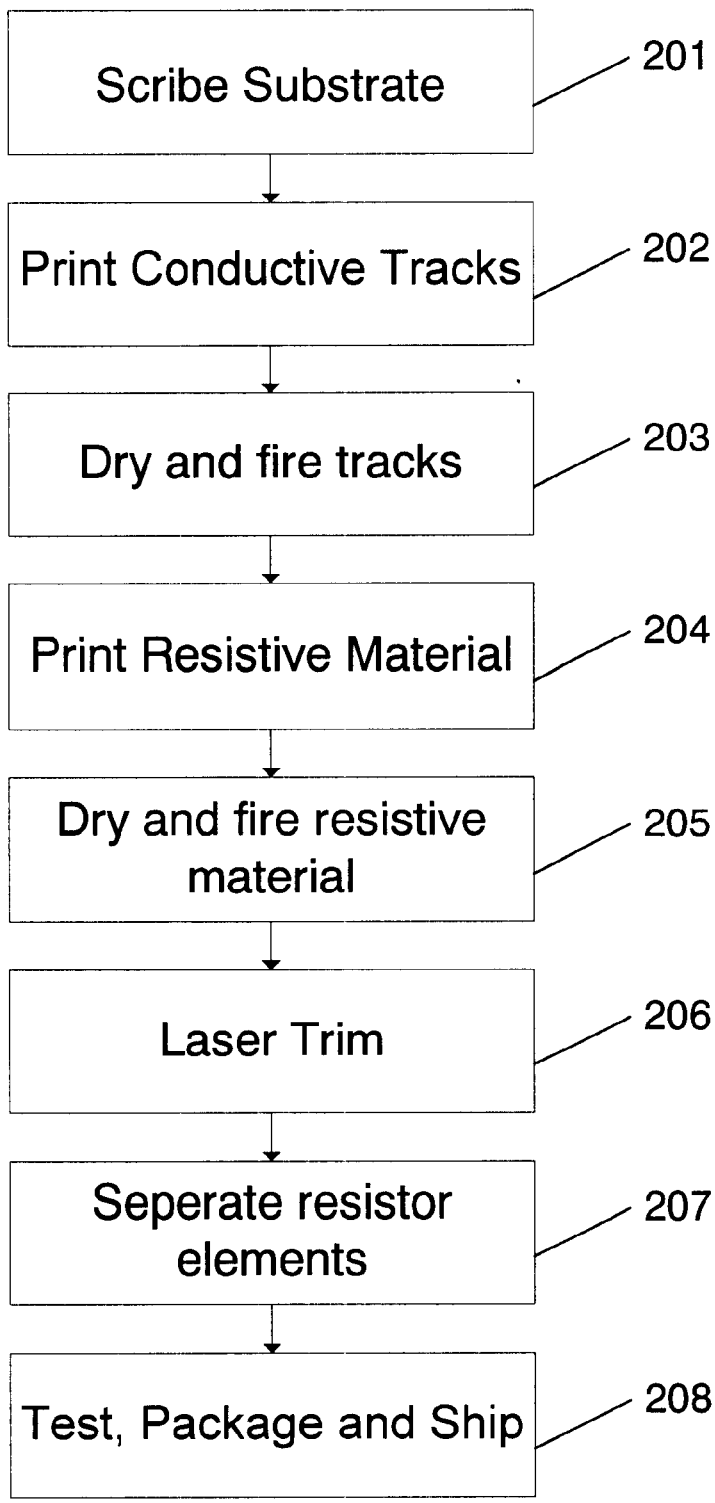
FIG. 2 depicts a simplified process flow diagram for a prior art process.

The process of manufacturing a resistor element 100 of the prior art, as illustrated in FIG. 2, begins with the laser scribing 201 of the ceramic substrate to facilitate the subsequent separation of the ceramic substrate into individual resistor elements substrate. The conductive tracks are deposited, using a conventional thick film screen printing process 202, dried and then fired 203. The resistor material is deposited over and between the conductive tracks by a further screen printing process 204. The resistor material is then dried in an oven and fired 205 in an furnace. The resistor may be laser trimmed 206 to the required resistance value, by making a series of cuts into the resistor, at appropriate points along the resistor. The previously scribed ceramic substrate is then broken 207 into individual resistor elements by breaking along the previously scribed lines; and finally the individual elements are tested, packed and shipped 208 to customers.

The conductive tracks 101 are arranged such that wiper contacts (not shown) only make electrical contact with the wiper contact area 104a, 104b of the conductive tracks 101 over the working sweep of the wiper. Because of the geometry of the resistor element layout, the wiper contacts are prevented from directly contacting the thick film resistor material 102, or the underlying abrasive ceramic substrate 107. As noted previously, direct contact with the resistor material 102 would lead to excessive contact resistance and an eventual wearing away of the resistor material 102 before the desired number of life cycles were achieved by the system.

The conductive traces 101 generally comprise precious metal alloys such as palladium-silver, and, to a lesser degree, gold-platinum, or gold-platinum-palladium. These alloys are compatible with the thick film manufacturing process, and can survive subsequent long-term exposure to various fuels. They are also formulated to be sufficiently hard to withstand the wear associated with hundreds of thousand of cycles of the wiper contact. The alloying elements, which are used to impart desired hardness properties to either gold or silver conductors in an air-fireable thick-film process, are typically selected for Platinum Group Metals (PGM), and, in particular, palladium.

The addition of palladium to silver also mitigates against the tendency of silver to form ions in the presence of moisture, and to physically migrate between conductive tracks, under the influence of an electrical potential. This phenomenon, known as metal migration, is minimized as the proportion of palladium in the alloy is increased.

As noted above, the PGM group are expensive elements and contribute significantly to the overall material cost of resistor elements.

In this invention, the need for PGM content of the resistor element is dramatically reduced by the use of alternative materials and by modifications to the resistor element manufacturing process to include a plating process.

Figure 3:
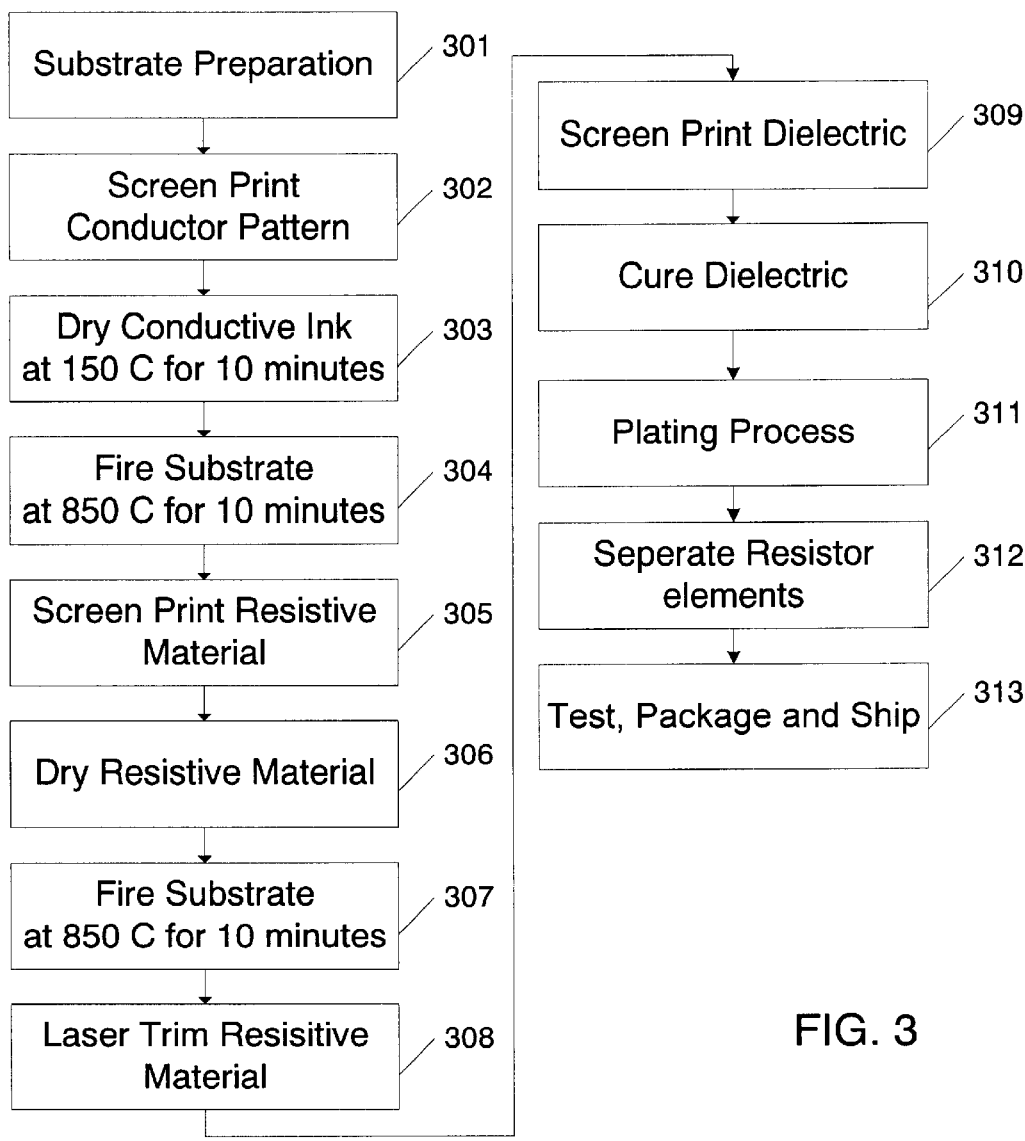
FIG. 3 depicts a process flow diagram for a method of manufacture of a resistive element according to the invention.
Figure 4:
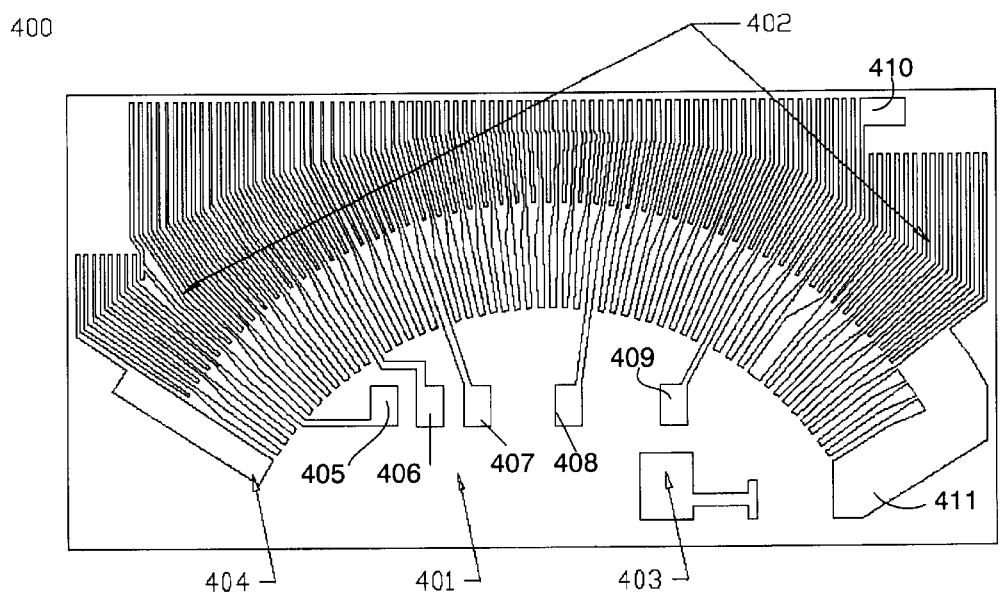
FIG. 4 illustrates a substrate after deposition of a first conductive pattern, in accordance with a preferred embodiment of the present invention.
Figure 5:
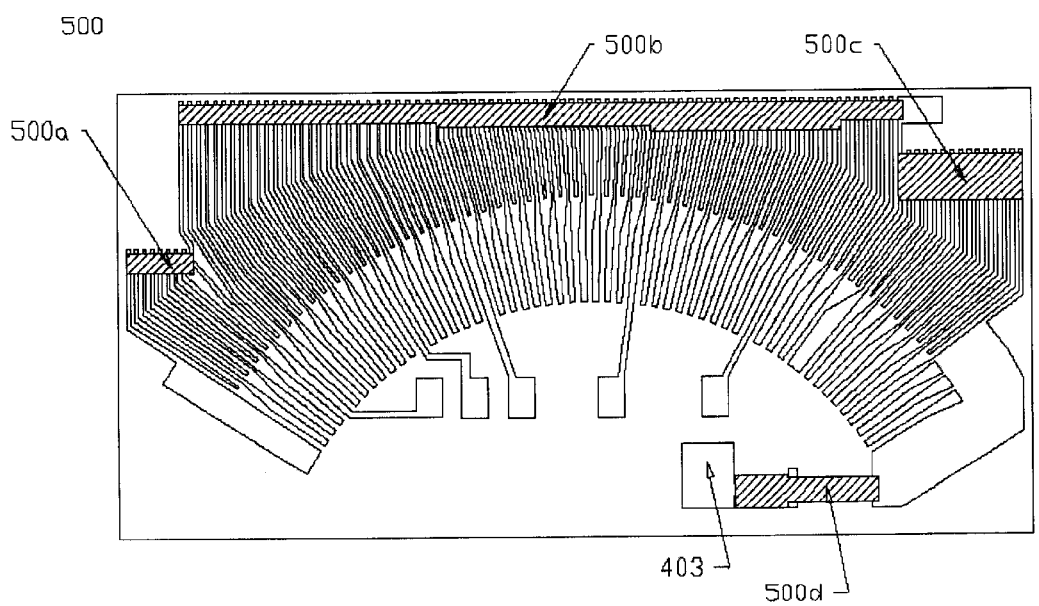
FIG. 5 shows resistor material added to the substrate of FIG. 4.

The process, as illustrated in FIG. 3, of the invention commences with the provision of a sheet of substrate 401. The substrate may be formed from any suitable material, e.g. porcelain coated steel, but is preferably ceramic. For reasons of efficiency, multiple variable resistor elements are fabricated from a single sheet of ceramic material. Thus for ease of subsequent division into individual units, the ceramic sheet is initially scribed (step 301) using a laser scribe or other suitable process. Then a pattern of conductive traces 402 is deposited (step 302), for example as conductive ink applied by a screen printing process, on the substrate 401. Of course, the individual screen for the printing operation is manufactured offline. A suitable material for the conductive traces is a low cost plateable silver ink. These inks use an oxide bonding mechanism for adhering to the ceramic substrate rather than a glass frit bonding mechanism.

One or more sections of the pattern of conductive traces provide one or more wiper contact areas for the electrical contact(s) of an associated wiper arm. The pattern of conductive traces also provides a plurality of contact areas 404–411, which may be used as test points for the subsequent laser trimming process and/or as subsequent lead attachment points.

After ink deposition, the ink must be fixed to the substrate. This fixing may be achieved by a combination of drying and firing steps, in which the substrate is initially placed in an oven, where the ink is dried (step 303), for 10 minutes at a temperature of 150° C. The substrate is subsequently fired (step 304) in a furnace, using a conventional 30 minute 850° C. profile, well known to practitioners in the thick film industry.

Resistor material 500a, 500b, 500c, 500d is then selectively deposited (step 305), e.g. by a screen printing process, on the substrate to contact said conductive traces 402. The resistor material is typically, a resistive ink that is preferably made from ruthenium oxide ($RuO_2$), with traces of palladium and silver to aid bonding to the conductive tracks and to modify the resistance of the ink. A variety of suitable products are available from different suppliers, but the various inks are based upon generally the same technology.

In the exemplary resistive element shown, the resistive material comprising the variable resistive element is divided into three separate regions 500a, 500b, 500c to accommodate the sensor layout. The three separate regions comprise the variable resistor element of the sensor. The three regions are electrically connected by sections of the pattern of conductive traces so as to form an electrically continuous resistive element.

Optionally, a further region of resistive material 500d is positioned between the lead connection pad 403a and a section 411 of the conductive traces 402 provided electrically connected with one end of the resistive element 500c. This further region of resistive material functions as a fixed resistor element 500d in series with the variable resistive element. The purpose of the fixed resistor element is to meet specific fuel sensor specifications, which may dictate that the sensor resistance is variable from an initial non-zero value to a final value, as the wiper contact is moved from one extreme 411 on the sensor contact area to the opposite extreme 404. The resistive material substantially overlaps the lead connection pad 403 so as to provide a solder barrier in future soldering processes.

If a series resistor is not required, the pattern of conductive traces would connect the end of the resistive element directly to the connection pad.

Subsequent to resistor printing 305, the resistor material is fixed to the ceramic substrate by preferably drying 306 the substrate in an oven at 150° C. for ten minutes, then firing 307 the substrate using a conventional 850° C., 30 minute profile in a furnace.

The resistor element 500a, 500b, 500c may then be trimmed 308 to a required resistance value, by making a series of cuts into the resistive material, at appropriate points along the resistor. These cuts may be made using conventional laser trimming technology in response to resistance measurements made. To facilitate laser trimming, the conductive pattern includes a number of test points 404–411. Similarly, the series resistor 500d may be trimmed to a required resistance value, and for which the lead connection pad 403 would function as a test point.

Figure 6:
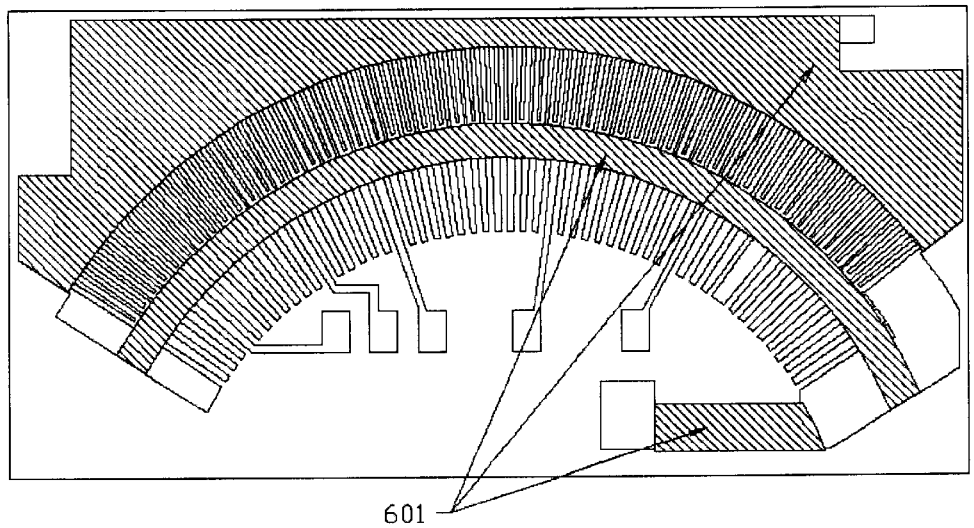
FIG. 6 depicts a dielectric material deposited on the substrate of FIG. 5.
Figure 7:
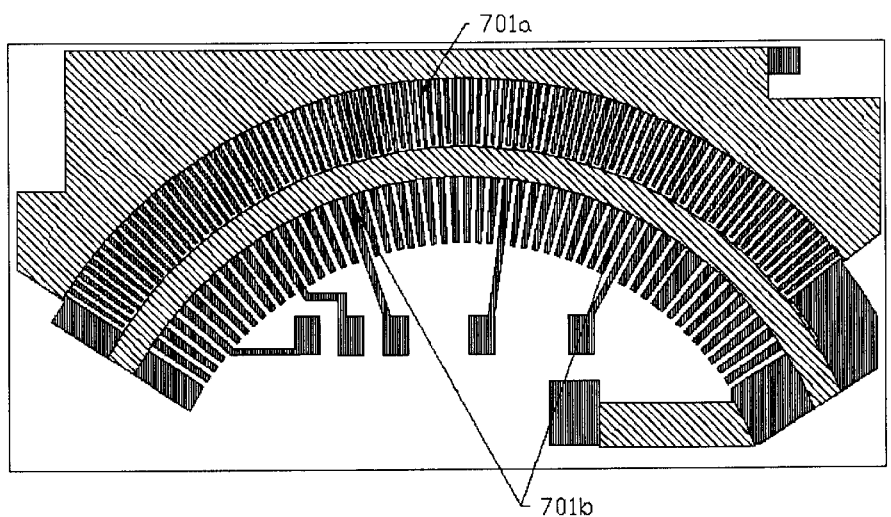
FIG. 7 depicts the device of FIG. 6 after plating.

A suitable protective layer 601, e.g. a dielectric or insulating material, is then printed 309 over the trimmed resistor, and over a portion of the conductive pattern of silver alloy tracks as illustrated in FIG. 6. The dielectric material is preferably a plating resistant, thermo set polymeric material, which is cured at 200° C. for about 30 minutes after printing, as indicated in step 310 of FIG. 3.

Alternatively, there are a number of other materials suitable for use as a protective layer, including a plating resistant low temperature glass dielectric, which is fired at 500° C. for 30 minutes. Higher temperature glass materials are less desirable, as the higher temperatures can lead to a resistance shift in the resistor material on the product.

The steps 309, 310 of including a protective layer 601 are preferable, as the silver concentration in the resist material after firing may be sufficient to initiate unwanted plating on the resist material. Such unwanted plating would significantly alter the resistance value of the device. However, careful selection of the resistive inks and plating processes may reduce the unwanted plating to an acceptable level where the need for a protective layer would be eliminated.

In addition to preventing unwanted plating, the protective layer 601 minimizes the area of silver tracks 101 for subsequent nickel and gold plating to the active wiper area and lead contact areas, thereby reducing the plating cost and also prevents metal migration of the non-plated silver traces.

The remaining exposed sections, shown in dashed outline in FIG. 6, of the of the pattern of silver traces are then plated 309 with a first plating. The plating 701 is suitably a hard nickel or nickel alloy material. In the present context, nickel alloy is understood to mean a nickel composition having a percentage by weight of nickel of at least 75% and preferably greater than 88%. Examples of suitable alloys include nickel phosphorous or nickel boron. One example of a suitable plating process is an electroless nickel plating process. In this plating process, the silver traces are readily activated in the plating process and act as a suitable seed site to initiate the electroless nickel-plating process. The dielectric material and the ceramic substrate are inert to the activation process and consequently are not subject to a plating build up in the plating process. Both the silver ink and the dielectric ink are suitably selected to be chemically resistant and not subject to degradation during the plating process.

Figure 8:
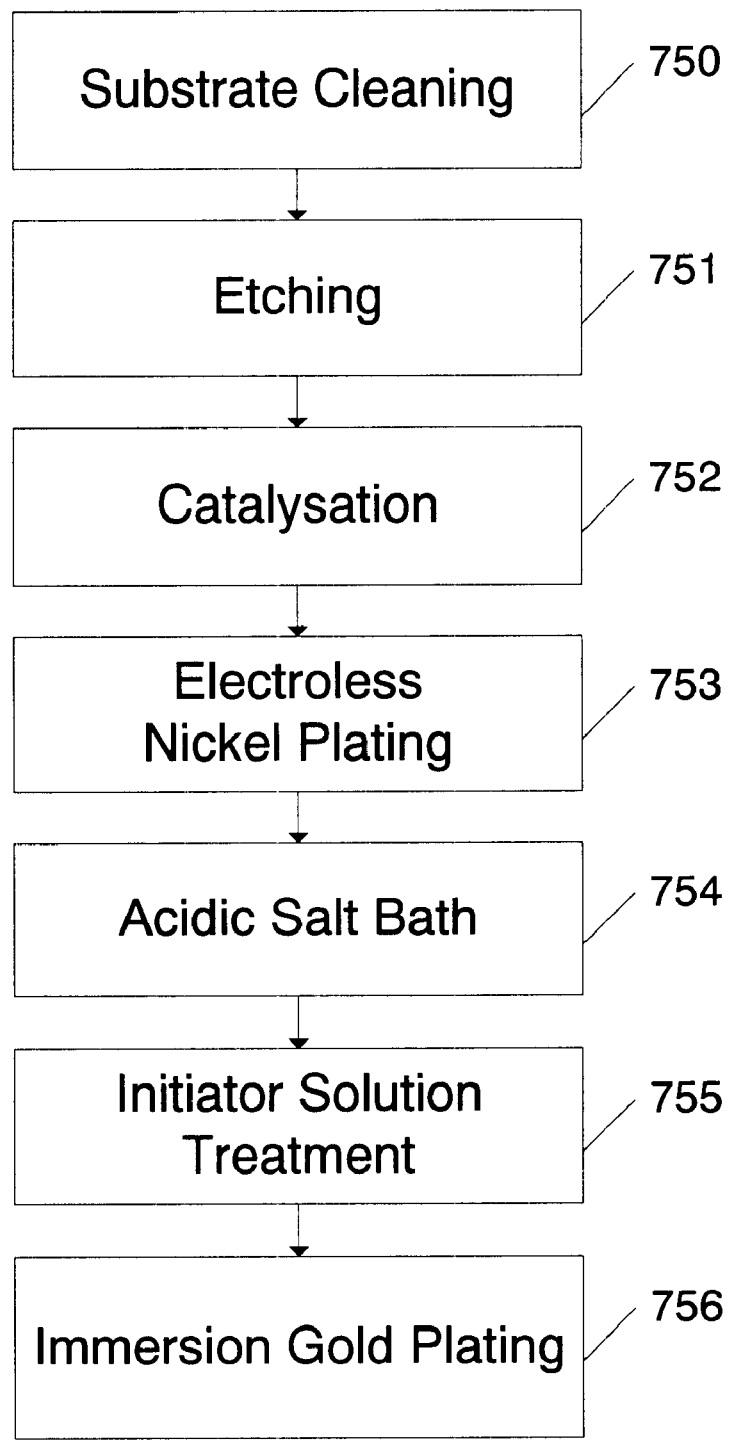
FIG. 8 is a process flow for a plating process for use in the method of manufacture of FIG. 3.

The plating process will now be explained in greater detail with reference to FIG. 8. In the plating process, the first plating deposited on the silver traces, in a nickel electroless plating process, is actually an alloy containing Nickel and Nickel Phosphide ($Ni_3P$). This alloy is a hard wearing and impervious barrier over the silver traces and protects the silver from chemical attack or corrosion. The nickel barrier also prevents metal migration of the underlying silver material.

In preparing the exposed silver circuit to accept the plating, a series of cleaning, etching and catalyzation steps are applied, such as would be known to one of ordinary skill in the art, in order to sufficiently activate the surface of the silver without adversely affecting the protective dielectric layer or substrate. During the plating process, the dielectric material remains inert.

The first step in the plating process is cleaning 750, which typically employs a surfactant, commonly referred to as a detergent or wetting agent that is suitably selected or formulated to perform a reasonable level of cleaning without doing any harm to the substrate. This cleaning is typically implemented by immersing the substrate in an agitated bath of surfactant.

An etching process 751 is subsequently used in order to achieve a strong mechanical bond in the subsequent plating step. Chemical bonds, or bonds without etch porosity contribute to adhesion but by themselves are insufficient and often fail in hostile environments or from thermal stresses. The etching process typically comprises the immersion of the substrate in a tank of etching solution in which the temperature and time of immersion are carefully controlled. Etching solutions may be acidic or alkaline based and condition the exposed silver traces to produce an even etched surface.

The final pre-treatment step is catalysation 752, which involves the immersion of the substrate in a tank containing, for example, a catalyst solution containing palladium nuclei. This step deposits a thin film of palladium nuclei on the etched silver areas, which are capable of catalyzing the decomposition of electroless nickel from a Nickel salt solution. The metal deposition (plating) process 753 takes place when the catalyzed part is immersed in an electroless plating bath. For a nickel plating process, the bath typically comprises a nickel salt, for example, nickel sulphate and nickel chloride, solution. With electroless deposition, deposition is chemical in nature and takes place wherever the surface is wetted. The plating, once initiated continues to deposit Nickel by autocatalytic reaction. The thickness of deposit is limited by the duration of the plating process. The required duration will depend on the nickel solution, the solution temperature and the thickness of nickel required. If the layer of nickel is too thin, the nickel will not be effective as a barrier to stop silver migration and may corrode. If the nickel layer is too thick, the nickel layer may become stressed in use. This stress may result in failure of the nickel layer through self-delamination. Accordingly, the nickel layer should have a thickness in the range of 5 to 12 microns, and preferably in the range of about 7 to 9 microns.

The nickel-plated traces may then be plated with a gold flash in an immersion gold plating process. An immersion plating process differs from an electroless plating process in that a reducing agent is not required. The base metal being plated onto (in this case nickel) acts as a reducing surface, and the plating process is self limiting as once the reducing surface is covered with the plating material, i.e. gold, the reaction stops. The gold flash provides a degree of corrosion protection to the nickel traces from the deleterious effects of fuel in a fuel tank. The gold flash also facilitates the attachment of wires to the resistor element using conventional soldering techniques, whereas nickel does not.

As nickel alloys are not autocatalytic to gold, surface preparation is required prior to subjecting the nickel plated substrate to a gold flash. Firstly, an acidic salt solution 754 is used to remove stubborn oxides and scales and provide a smut-free Nickel surface.

The substrate is then treated in an initiator solution 755, for example of palladium-tin colloidal initiator. The colloidal solution deposits a thin layer of non-conductive palladium-tin nuclei on the nickel surface, which subsequently promotes the formation of a Gold deposit.

The substrate is then immersed 756 in a bath of immersion gold solution. This immersion causes a very thin immersion layer of Gold, having a thickness in the range of 0.15 to 0.25 microns, typically towards the lower end of the range, to form on the nickel surface. The thickness of the deposit obtained by the immersion plating is limited, because deposition stops when the entire surface of the base Nickel metal is coated. A thin layer of gold is preferred as a thicker gold layer, as might be obtained in an electrolytic plating process, can cause brittle solder joints in subsequent soldering.

Only the wiper areas of the silver traces and the solder pad(s) are subjected to the electroless nickel and gold plating processes. The remaining areas of the conductive traces and the resistive material are suitably encapsulated by the dielectric material. The dielectric material protects the underlying silver traces from chemical attack and metal migration. The dielectric material also prevents the resist material from plating build up as there may be trace amounts of silver or palladium silver in the resist material, which could initiate plating on the resist material.

In use, it is expected that the action of the wiper will wear away the gold flash in the wiper area within a very short time. However, the ongoing reliability and operation of the fuel level sensor should continue, as any corrosion products such as oxides, chlorides, or sulphides which form on the exposed nickel traces, will be removed by the wiping action of the wiper contact.

It will be appreciated that the initial steps of the process of manufacture of the resistive element are conventional in the art, and that the plating process may be suitably modified to be used with pre-manufactured resitive elements. It will further be appreciated that although electroless plating is particularly suited for the nickel plating process, nickel could be deposited using electroplating. However, electroplating would require electrical connections for all the pads and tracks to provide a common path for current to flow for the purpose of electroplating. Such a connection could be applied by supplying a separate track portion on the substrate connecting the various areas, however this would have to be subsequently removed. Similarly, the gold plating could be applied using electroplating.

The gold or gold alloy could also be applied using an electroless process, but the immersion gold process is a simpler, faster, more efficient process and is easier to control. In addition, immersion gold does not require a reducing agent like electroless gold. Electroless gold can yield thicker deposits in the order of 3–4 microns. However, flash immersion gold is suited to the present application the hard nickel underneath is ultimately intended to provide the operating surface in use. Both immersion and electroless gold are soft gold deposits and will wear away in wiping applications.

Figure 9:
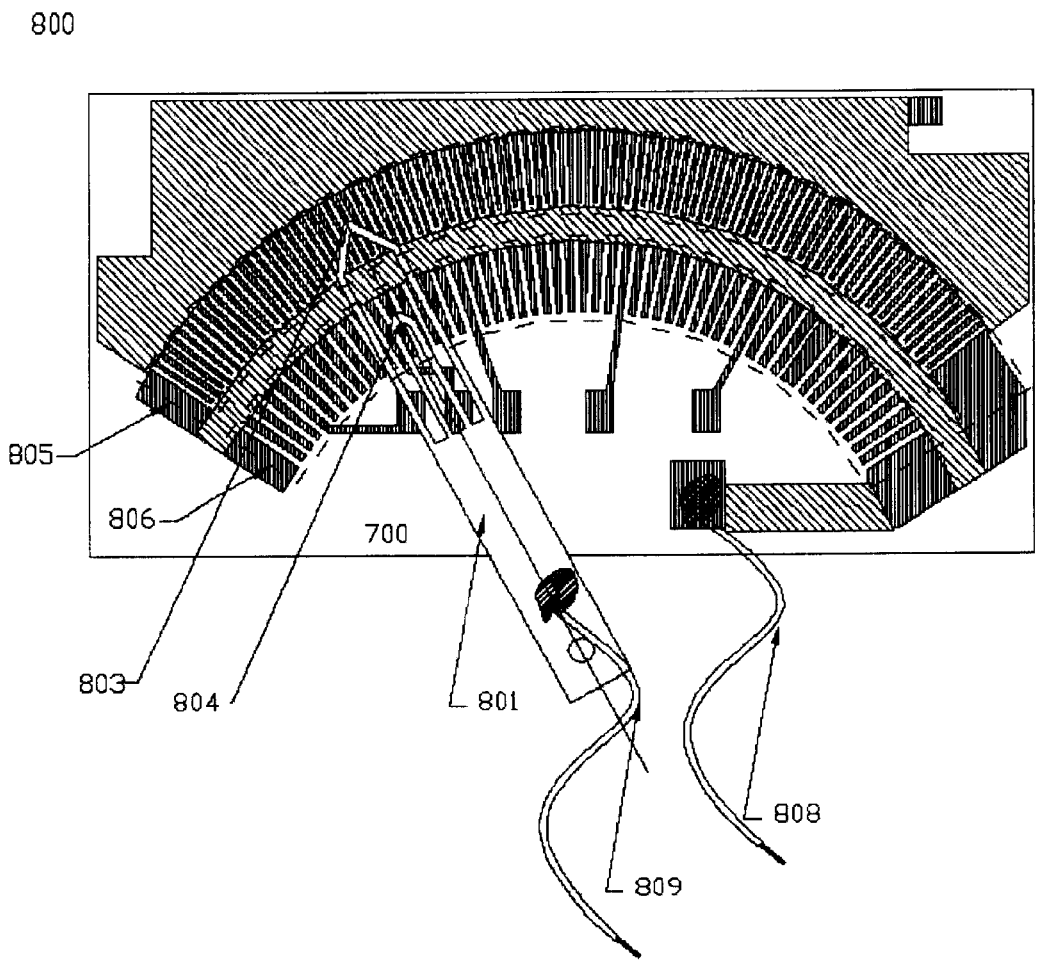
FIG. 9 shows a sensor element comprising a wiper arm and the plated device of FIG. 7.

FIG. 9 illustrates the interconnection of a wiper assembly 801 with a variable resistor element 700 in accordance with the present invention to form a sensing element. As shown, the wiper assembly 801 includes wiper contacts 803, 804 that are positioned such that the wiper contacts 803, 804 make electrical contact with the gold/nickel plated silver conductive traces 701 disposed within the working wiper areas 805, 806, shown in dashed outline. Electrical leads 808, 809 make electrical contact between the resistive element 700 and the wiper assembly 801 for connection to a measurement circuit.

The nickel plating has a hardness value between 500 HV (Vickers Hardness) and 600 HV depending on the phosphorus content of the plating bath (the higher the content the harder the plating). This compares with a hardness of between 40 HV and 90 HV for the conventional palladium silver traces and a hardness of between 40 HV and 70 HV for a conventional silver nickel (Ag/Ni) contact button, used as electrical contacts on the wiper arm. As the nickel plating is relatively hard, it is anticipated that there will be minimal wear on the wiper contact area of the conductive traces. Instead, any wear is likely to occur on the wiper contact button. A conventional silver nickel contact button may not be sufficiently hard to withstand the wear over a required lifetime.

To achieve longer lifetimes, a solid nickel button with a hardness of between 100 HV and 200 HV may be used. As there is no silver in this button, the problem of silver sulphide formation on the assembly should not be a problem. A further alternative would be a button with a hard nickel, or nickel alloy e.g. palladium nickel, plating on the contact button. These materials would be harder and would be more wear resistant in this application.

The relatively high hardness of the nickel traces also allows for a higher contact force between the wiper button and the nickel traces. This higher contact force would be more efficient in terms of the removal of any corrosion products from the contact faces. It would also reduce contact noise caused by vibration of the contact on the resistor element.

Figure 10:
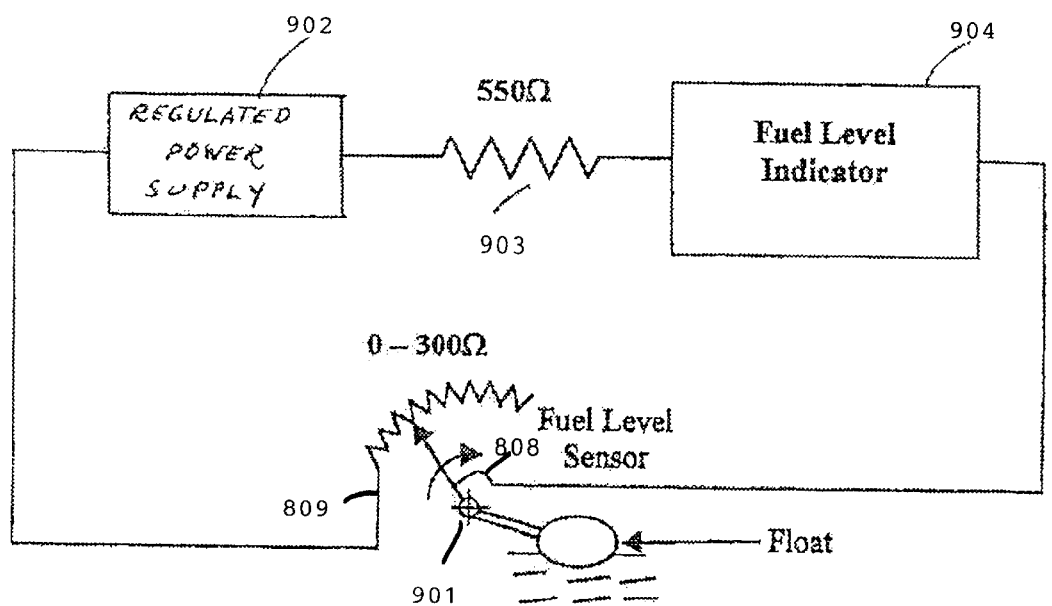
FIG. 10 depicts a fuel level measurement circuit incorporating a sensor element in accordance with the present invention.

FIG. 10 illustrates a typical measurement circuit for use with the herein described resistive element. The electrical leads 808, 809 (FIG. 9) extend from the sensing element/float assembly 901 to form a series circuit with a regulated power supply 902, a series resistor 903, and a fuel level indicator 904. The regulated power supply 902 may be the output of the automotive voltage regulator, with a nominal output voltage of 12 volts DC. A relatively small fixed resistor 903 is generally incorporated in series with the indicator 904. The resistance range that can be expected from the sensing element/float assembly 01 is from about zero ohms to 400 ohms, depending upon the level of fuel. The fuel level indicator can be, for example, a conventional moving-coil meter movement, a well-known digital display based upon current or voltage measured in the measurement circuit, or even an analogue indicator whose position is set by an associated stepper motor assembly.

There is an increasing trend for higher resolution of the fuel senders in the market. This is driven by the need to provide the driver with more accurate information on the range of fuel remaining in the fuel tank. These higher resolutions can only be achieved by increasing the number of conductor traces and resistor segments on the fuel sender element. In order to increase the number of conductor traces, the width of the traces must be reduced to allow for a higher trace density. However the reduction of the trace line width also causes a reduction in the conductor thickness above the ceramic substrate. Typically the thickness of the conductor reduces from a range of 10 $\mu$m–12 $\mu$m, to 8 $\mu$m–10 $\mu$m or less. Traditionally a thinner conductor trace means a shorter product life as there is less material to wear before the contact button wears the trace away to the underlying ceramic substrate. In this invention, the use of nickel traces, apart from reducing the need for PGM constituents, enables the provision of a resistive element for a fuel sensor which is relatively impervious to wear, has a high resolution and a long life.

There has been described herein a resistive element suitable for use in a fuel level sensing system that offers distinct advantages when compared with the prior art. It will however be apparent to those skilled in the art that the variable resistor described may be used for other applications other than fuel level sensing system. It will further be apparent to those skilled in the art that modifications may be made without departing from the spirit and scope of the invention. Accordingly, it is not intended that the invention be limited except as may be necessary in view of the appended claims.

What is claimed is:

1. A variable resistance sensor, comprising:
   an insulative substrate;
   a pattern of thick film conductive traces formed on the substrate;
   a thick film resistive element formed on the substrate so as to overly and make electrical contact with a first region of the pattern of conductive traces;
   an insulative protective coating formed on the resistive element;
   a protective conductive metal plating layer formed on the conductive traces in a second region of the pattern of conductive traces; and
   an electrically conductive wiper contact sidable along the second region of the pattern of conductive traces so as to establish electrical contact therewith.

2. The sensor of claim 1, wherein the plating layer is made of a material selected from the group consisting of nickel and nickel alloy.

3. The sensor of claim 1, wherein the protective coating is made of a material selected from the group consisting of glass and insulative polymer.

4. The sensor of claim 1, wherein the protective conductive metal plating layer is a first protective conductive metal plating layer, and wherein the sensor further comprises a second protective conductive metal plating layer formed over the first protective conductive metal plating layer.

5. The sensor of claim 4, wherein the second protective conductive metal plating layer is formed of a material selected from the group consisting of gold and gold alloy.

6. A fuel level sensor system, comprising:

an insulative substrate having a major surface;

a variable resistance element on the major surface of the substrate, the variable resistance element comprising a pattern of thick film conductive traces formed on the major surface of the substrate and a first thick film resistive element formed on the major surface of the substrate so as to overly and make electrical contact with a first region of the pattern of conductive traces;

a conductive metal film contact pad on the major surface of the substrate in contact with the resistance element;

an insulative protective coating formed on the variable resistance element;

a protective conductive metal plating layer formed on the conductive traces in a second region of the pattern of conductive traces and on the contact pad;

a float element; and a sliding conductive contact connected to the float element and in movable contact with the second region of the pattern of conductive traces, the sliding conductive contact being movable in response to changes in the position of the float element.

7. The fuel level sensor system of claim 6, wherein the plating layer is made of a material selected from the group consisting of nickel and nickel alloy.

8. The fuel level sensor system of claim 6, wherein the protective coating is made of a material selected from the group consisting of glass and insulative polymer.

9. The fuel level sensor system of claim 7, wherein the plating layer is a first protective conductive metal plating layer, and wherein the sensor system further comprises a second protective conductive metal plating layer formed over the first protective conductive metal plating layer.

10. The fuel level sensor system of claim 9, wherein the second protective conductive metal plating layer is formed of a material selected from the group consisting of gold and gold alloy.

11. The fuel level sensor system of claim 8, wherein the metal film contact pad is a first metal film contact pad, the system further comprising:

a second conductive metal film contact pad on the major surface of the substrate and spaced apart from the first metal film contact pad; and a fixed resistance element on the major surface of the substrate and comprising a second thick film resistive element connecting the first and second contact pads;

wherein the insulative protective coating is formed on the variable resistive element and on the fixed resistive element; and wherein the protective conductive metal plating layer is formed on the conductive traces in a second region of the pattern of conductive traces and on the first and second contact pads.

* * * * *